M. J. FENELON.
VEHICLE WASHING MACHINE.
APPLICATION FILED NOV. 17, 1919.

1,423,844.

Patented July 25, 1922.

Witnesses:
C. E. Wessels.
Thos. S. Donnelly

Inventor:
Martin J. Fenelon,
By Joshua R. H. Potts
his Attorney.

UNITED STATES PATENT OFFICE.

MARTIN J. FENELON, OF CHICAGO, ILLINOIS.

VEHICLE-WASHING MACHINE.

1,423,844. Specification of Letters Patent. Patented July 25, 1922.

Application filed November 17, 1919. Serial No. 338,626.

*To all whom it may concern:*

Be it known that I, MARTIN J. FENELON, a citizen of the United States, and a resident of the city of Chicago, county of Cook, and State of Illinois, have invented certain new and useful Improvements in Vehicle-Washing Machines, of which the following is a specification.

My invention relates to new and useful improvements in vehicle washing machines, and has for its object the provision of a vehicle washing machine which will be simple in structure, economic of manufacture, and highly efficient in use.

Other objects will appear hereinafter.

The invention consists in the combinations and arrangements of parts hereinafter described and claimed.

Figures 1, 2:
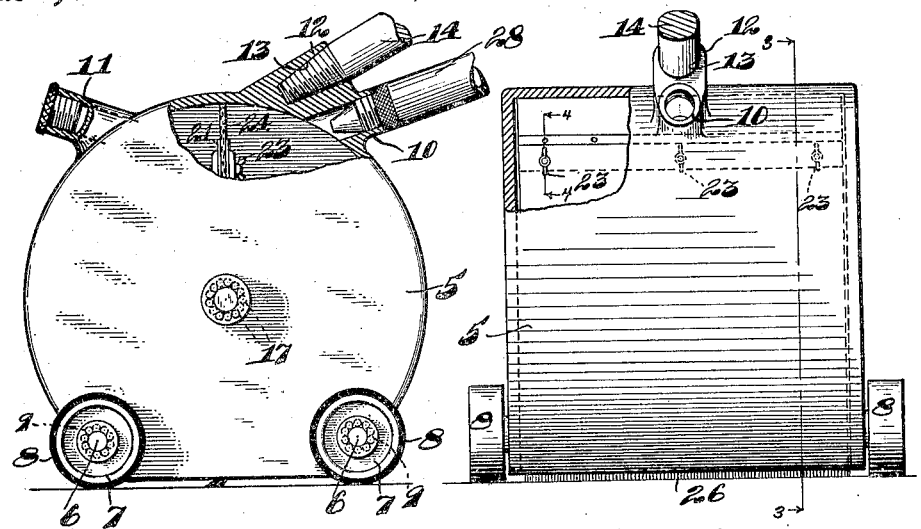
Figure 3:
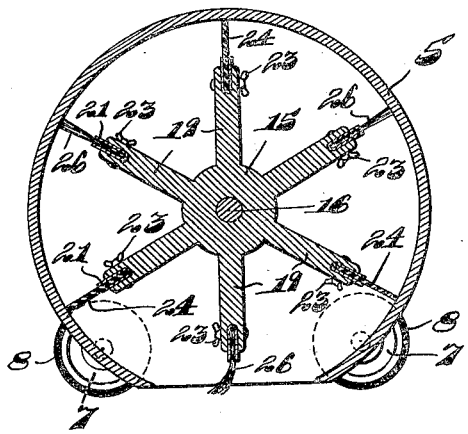
Figure 4:
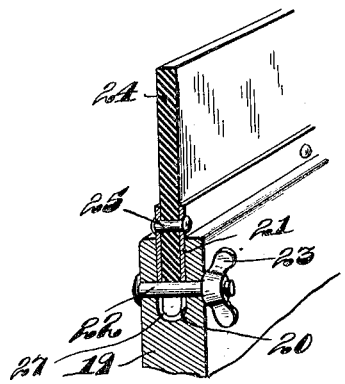

The invention will be best understood by reference to the accompanying drawings forming a part of this specification, and in which, Fig. 1 is a side elevational view of my invention, showing parts in section, Fig. 2 is a rear elevational view of my invention with a part removed, Fig. 3 is a sectional view taken on substantially line 3—3 of Fig. 2, and Fig. 4 is a sectional view of one of the cleaning members.

The approved form of construction comprises a housing 5 projecting outwardly from the ends of which, adjacent the lower edge, are suitable trunnions or shafts 6, upon each of which is mounted a suitable wheel 7 which is provided with a rubber tire 8. Ball bearings 9 are positioned about the shaft 6 in the usual manner. An interiorly threaded nipple 10 is mounted upon the housing 5 so as to communicate with the interior thereof. This nipple is inclined so that the passage there-through is directed at an angle to a vertical plane passed through the housing. As shown in Fig. 1, the member 10 is mounted upon the housing 5 adjacent one side. A similar nipple 11 is mounted on the housing 5 adjacent the opposite side, and inclined in the opposite direction in order that the direction of rotation of the rotatable elements may be reversed, thereby obtaining the use of each cleaning element on both sides of its outer edge. A socket bearing member 12 is formed upon the housing preferably made integral therewith which has an interiorly threaded socket 13 for the reception of an interiorly threaded handle 14. A hub 15 is rotatably mounted upon a shaft 16 which is journaled in the side walls of the housing 5.

Positioned about the journaled end of the shaft 16 are suitable ball bearings 17 arranged in the usual manner. Radiating from the hub 15 are suitable arms or paddles 19 which are provided at their outer edges with a slot or groove 20, which extends through-out the length of the member 19. Loosely mounted in the slot or groove 20 is a U-shaped channel member 21 which is secured to the member 19 by means of a bolt 22 and a thumb screw 23. Rigidly mounted in the member 21 by means of a suitable bolt or screw 25 is a rubber strip 24 or a tuft of bristles 26. As clearly seen in Fig. 3, the paddles or arms 19 are provided alternately with the rubber strip and the tuft of bristles. The members 21 are provided with elongated radial slots 27, through which the bolts 22 project. This method of mounting affords a means of adjusting the position of the members 24 and 26 relatively to the inner surface of the housing 5.

The device is designed especially for washing automobile bodies and when used for this purpose, a hose 28 is connected to either the nipple 10 or 11 and water forced into the housing 5 to rotate the paddles in either direction. The water entering the housing 5 strikes the paddles 19 at an angle so as to cause rotation of the hub 15. This rotation of the hub 15 causes the members 24 and 26 to contact with and brush or clean the body of the object which is being washed. This is due to the fact that the adjustment of the members 26 and 24 is such that these members project from the lower edge of the end walls of the housing 5 at the lower or open space of the housing. At the same time water is delivered to the body which is being washed. The wheels prevent any portion of the housing 5 coming into contact with the body of the car, and thereby prevents scratching or marring of the same.

In the use of such a device, of course, any fluid may be used as well as water, and in many of the uses to which my device may be put, such as cleaning grease from machinery, steam may be injected into the housing instead of water.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. A cleaning device comprising a housing; a hub rotatably mounted in said housing; cleaning members radially and adjustably mounted with respect to said hub; and separate means mounted on the opposite sides of said housing for directing fluid against either side of said members for rotating the same in either direction, substantially as described.

2. A cleaning device comprising a housing; cleaning members rotatably mounted in said housing; means for adjusting said cleaning members relatively to the inner surface of said housing; and means for directing liquid directly against said members for rotating the same, substantially as described.

3. A cleaning device comprising a housing; a hub rotatably mounted in said housing; paddles radiating from said hub, said paddles being grooved at their outer edges; cleaning members; and means including slotted channel members for adjustably securing said cleaning members in said grooves, substantially as described.

4. A washing device comprising a cylindrical housing; a hub rotatably mounted in said housing; paddles radiating from said hub and having grooves in the outer edges; cleaning members; slotted channel members positioned in said grooved edges for securing said cleaning members; and means extending through said slotted channel members and paddles for adjustably mounting said channel members and said cleaning members with respect to the inner surface of said housing, substantially as described.

In testimony whereof I have signed my name to this specification in the presence of two subscribing witnesses.

MARTIN J. FENELON.

Witnesses:
JOSHUA R. H. POTTS,
ROSE K. TRIB.